United States Patent [19]
Yokoyama

[11] Patent Number: 5,875,389
[45] Date of Patent: Feb. 23, 1999

[54] SSB RADIO RECEIVER

[75] Inventor: Nobuaki Yokoyama, Tokyo, Japan

[73] Assignee: General Research of Electronics, Inc., Tokyo, Japan

[21] Appl. No.: 733,097

[22] Filed: Oct. 16, 1996

[51] Int. Cl.$^6$ .............................. H04B 1/68; H04B 1/16
[52] U.S. Cl. .................... 455/203; 455/204; 455/206; 455/209; 455/307
[58] Field of Search ................................. 455/203, 204, 455/206, 207, 209, 266, 307, 311, 312, 313, 314, 315, 296

[56] References Cited

U.S. PATENT DOCUMENTS

| | | | |
|---|---|---|---|
| 3,100,871 | 8/1963 | Richardson | 455/203 |
| 3,287,645 | 11/1966 | Baghdady | 455/206 |
| 4,188,579 | 2/1980 | Yoshisato | 455/76 |
| 4,313,216 | 1/1982 | Jaeger et al. | 455/226 |
| 4,403,348 | 9/1983 | Leland et al. | 455/203 |

Primary Examiner—Reinhard J. Eisenzopf
Assistant Examiner—Darnell R. Armstrong
Attorney, Agent, or Firm—Trexler, Bushnell, Giangiorgi & Blackstone, Ltd.

[57] ABSTRACT

An SSB radio receiver having an inexpensive wide-band IF filter which passes through not only a reception objective SSB station IF signal but also an interference SSB station IF signal simultaneously. These signals are SSB-detected to reproduce the original modulating audio signals with a BFO frequency, the BFO frequency itself located out of the pass-band of the wide-band IF filter. The frequency of the reception objective SSB station IF signal is selected to be nearest to the BFO frequency, preferably at an end of the pass-band width of the IF filter. Frequency spectrums of the SSB-detected audio signals are separated by a frequency difference comprising the difference between the BFO signal and the IF signals. The SSB-detected audio signals are applied to a selected low-pass filter, such as an inexpensive active filter, having a pass-band which covers or passes only the SSB-detected audio signal of the reception objective SSB station IF signal.

19 Claims, 3 Drawing Sheets

SSB RADIO RECEIVER

BACKGROUND OF THE INVENTION

The present invention relates to a novel SSB (single sideband) radio receiver. More particularly, the present invention relates to a SSB radio receiver which is intended to reduce the cost of production of such SSB radio receivers, by avoiding the use of an expensive band-pass filter associated with and utilized in prior art SSB radio receivers. Specifically, the present invention negates the need for the usage of expensive band-pass filters which only have a narrowband characteristic to pass only a specific SSB signal.

Generally, an information signal in the form of a typical amplitude-modulated wave has information signals which are contained and distributed uniformly on two sidebands about a central carrier frequency. A system in which these two sidebands are transmitted is called a DSB (double sideband) system. Alternately, a system in which only one of the sidebands is transmitted is called an SSB (single sideband) system. In the SSB system, a required minimum occupied frequency band is transmitted, which results in a higher utilization efficiency in a frequency spectrum, along with higher efficiency in radiation power. Further, the SSB systems have the additional advantages of reducing or eliminating the problems associated with signal interference, signal strength fading, noise and so on.

A SSB radio receiver is used in order to receive an SSB signal. Ordinarily, the typical SSB receiver has a filter such as an intermediate-frequency (IF) filter which allows for the passage of only a single sideband signal that is within the central frequency range of this filter. Usually, a specially designed crystal, ceramic or mechanical filter, having a narrow-band characteristic for passing therethrough only the specified SSB signal, is utilized for this function.

In the typical SSB system, a narrow band-pass filter is utilized for passing the SSB signal, which is in itself very expensive, and its existence in the SSB radio receiver has been an obstacle to a reduction in the production cost of all SSB radio receivers.

In contrast to the prior art SSB receivers, the present novel invention provides a SSB radio receiver in which the expensive narrow-band filter is eliminated and replaced by an inexpensive filtering combination. This inexpensive filtering combination offers the functional equivalent to that of the expensive narrow-band filter, in order for the production cost of the SSB radio receiver to be dramatically reduced. The present invention achieves this novel and practical objective by combining an inexpensive wide-band IF filter with an inexpensive low-pass filter, in conjunction with a SSB detecting stage in the SSB radio receiver, allowing for the reception of a targeted reception objective SSB station IF signal without the use of the prior art expensive narrow-band filter. Other features and advantages of the present invention will become apparent upon a reading of the attached specification.

SUMMARY OF THE INVENTION

A general object of the present invention is to provide a novel and improved SSB (single sideband) radio receiver.

A more particular objective is to provide a SSB radio receiver which utilizes an inexpensive filter combination to replace a typical expensive narrow-band filter presently used in conventional SSB radio receivers, resulting in a favorable reduction of the production costs of SSB radio receivers.

A further objective is to provide a functional equivalent to the typical expensive narrow-band filter presently used in conventional SSB radio receivers, by combining an inexpensive wide-band IF filter and an inexpensive low-pass filter, in conjunction with a SSB detecting stage in the SSB radio receiver, without the use of the prior art expensive narrow-band filter.

Briefly, and in accordance with the foregoing, the present invention utilizes a frequency converter which provides an IF signal of a SSB station signal, or SSB station IF signal, to the SSB radio receiver. The SSB station IF signal is applied to an inexpensive wide-band IF filter, which allows for the simultaneous passage of the reception objective SSB station IF signal and at least one SSB station IF interference signal.

The reception objective SSB station IF signal, which is located within the pass-band width of the wide-band IF filter, and is closest in frequency to a BFO (beat frequency oscillator) signal positioned in the cut-off frequency area of the wide-band IF filter, is SSB-detected as a reception objective signal. Since the inexpensive IF filter used in this invention is of a wide-band characteristic, as previously mentioned, it may also pass through other SSB station IF interference signals within the pass-band width of the wide-band IF filter. These other SSB station IF interference signals are also SSB-detected.

A SSB detector receives both IF signals and simultaneously SSB-detects both IF signals with the BFO frequency. However, since the SSB station IF interference signal's frequency difference from the BFO signal frequency are larger than the frequency difference of the detection objective signal from the BFO signal frequency, the detected audio outputs of the SSB station IF interference signals are distributed over higher frequency bands along the frequency spectrum than the frequency band of the detected reception objective signal.

The BFO frequency, which is located out of the pass-band of the wide-band IF filter, provides an original modulating audio signal carried by the received IF signals, as SSB-detected output. The frequency spectrums of the SSB-detected audio signals are separated by a frequency difference comprising the difference between the BFO frequency and the individual IF signal frequencies.

The SSB-detected output is then applied to a low-pass filter having a pass-band in which an upper frequency limit of the SSB-detected output of the reception objective SSB station IF signal can be passed through by the lowpass filter, while the lower frequency limit of the SSB-detected output of the interference SSB station IF signal, which is farther in frequency from the BFO frequency, is cut off by said low-pass filter. The inexpensive low-pass filter, in other words, enables the passage of only the SSB-detected detection objective signal by selectively passing through only the detected audio output signal distributed over the lowest frequency band, with the other interference detected signals cut off by the low-pass filter.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION

Figure 1:
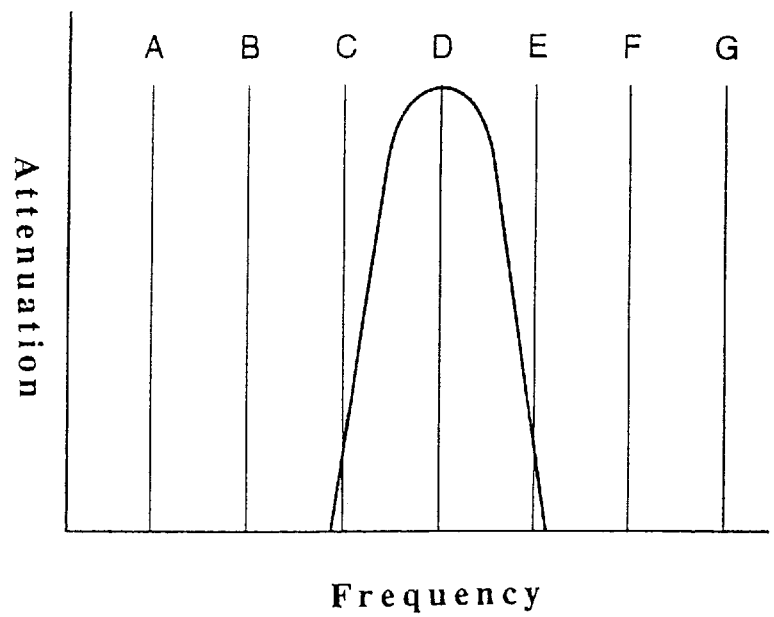
FIG. 1 is a graphical representation of a frequency response characteristic of a traditional narrow-band pass IF filter as used in a prior art SSB radio receiver.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention is directed to a novel SSB (single sideband) radio receiver which utilizes an inexpensive wide-band IF filter and an inexpensive low-pass filter in conjunction with a SSB detecting stage contained within the SSB radio receiver.

FIG. 1 shows a conventional frequency response characteristic of a band-pass filter (IF filter) having a narrow-band characteristic, which is typically used in the prior art SSB radio receiver in advance of a SSB detecting stage. Symbol "D" identifies and illustrates an IF frequency of a received SSB station signal as it passes through the central frequency of the band-pass filter (IF filter) having a narrow-band characteristic. With such a narrow-band filter, signals at frequencies C and E can be sufficiently reduced or eliminated through the proper attenuation of those signals. Further, signals at frequencies A, B, F and G are cut off by the narrow-band filter, as they are out of the pass-band of the filter. Therefore, only the signal at frequency D is selectively passed through the narrow-band filter. In order for the SSB radio receiver to reproduce the SSB station IF signal at frequency D, a BFO (beat frequency oscillator) signal located at frequencies C or E is used in a detection stage of the SSB radio receiver, providing an original modulating audio signal carried by the received IF signal.

This type of conventional prior art narrow-band filter used in conventional SSB receivers, however, is usually a very expensive specially designed crystal, ceramic, or mechanical filter. The incorporation of such expensive filters into a SSB radio receiver necessarily makes the desired reduction of the production costs of the SSB radio receiver very difficult to achieve.

Figure 2:
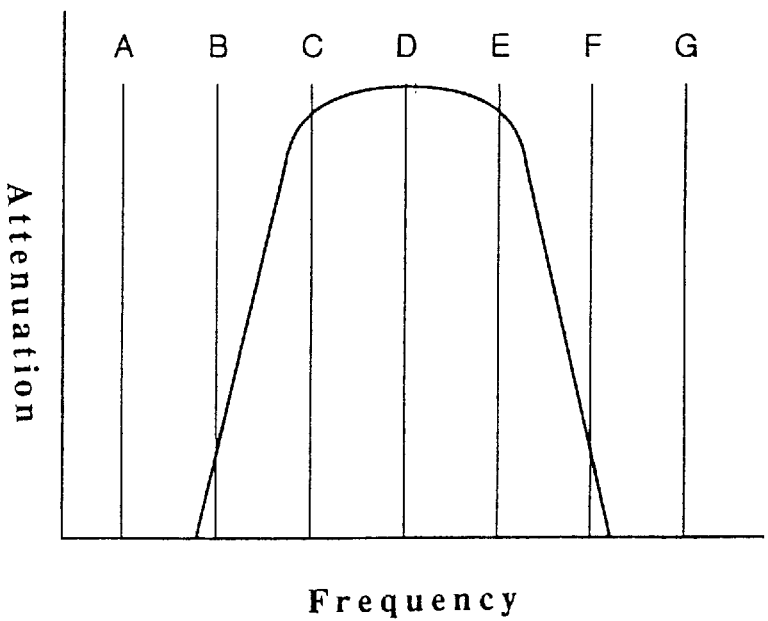
FIG. 2 is a graphical representation of a frequency response characteristic of an IF filter as used in an SSB radio receiver according to this invention.

FIG. 2 illustrates an example of the frequency response characteristic of a wide-band filter (IF filter) used in a SSB radio receiver, in accordance with the principles of the present invention. As is apparent from the comparison of FIG. 1 against FIG. 2, the passband width of this wide-band filter (IF filter) is wider necessarily allowing the passage of SSB station IF signals located at C, D, and E, at substantially the same signal level. Therefore, if an SSB reception objective signal is located at frequency C, this signal C is passed through the filter together with signals at frequencies D and E. This simultaneous passage of signals, however, causes an interference relationship between the reception objective signal C, and the other signals D and E (interference signals) which have also passed through the wide-band filter. This interference relationship results in the fact that clear reception on the SSB station signal C cannot be obtained by the SSB receiver because of the interference with the other SSB signals D and E. The same interference situation similarly occurs where the targeted reception objective signal is at D or E.

Such wide-band filters, however, are considerably lower in price as compared to the conventional prior art narrow-band filters used in prior art SSB receivers. In the present SSB radio receiver, a wide-band filter is utilized in conjunction with a low-pass filter, the low-pass filter typically being added after an SSB-detection stage, so that the SSB reception objective signal can be selectively provided as a SSB receiver output signal without interference, even though there are other SSB signals which can also pass through the wide-band IF filter.

Figure 3:
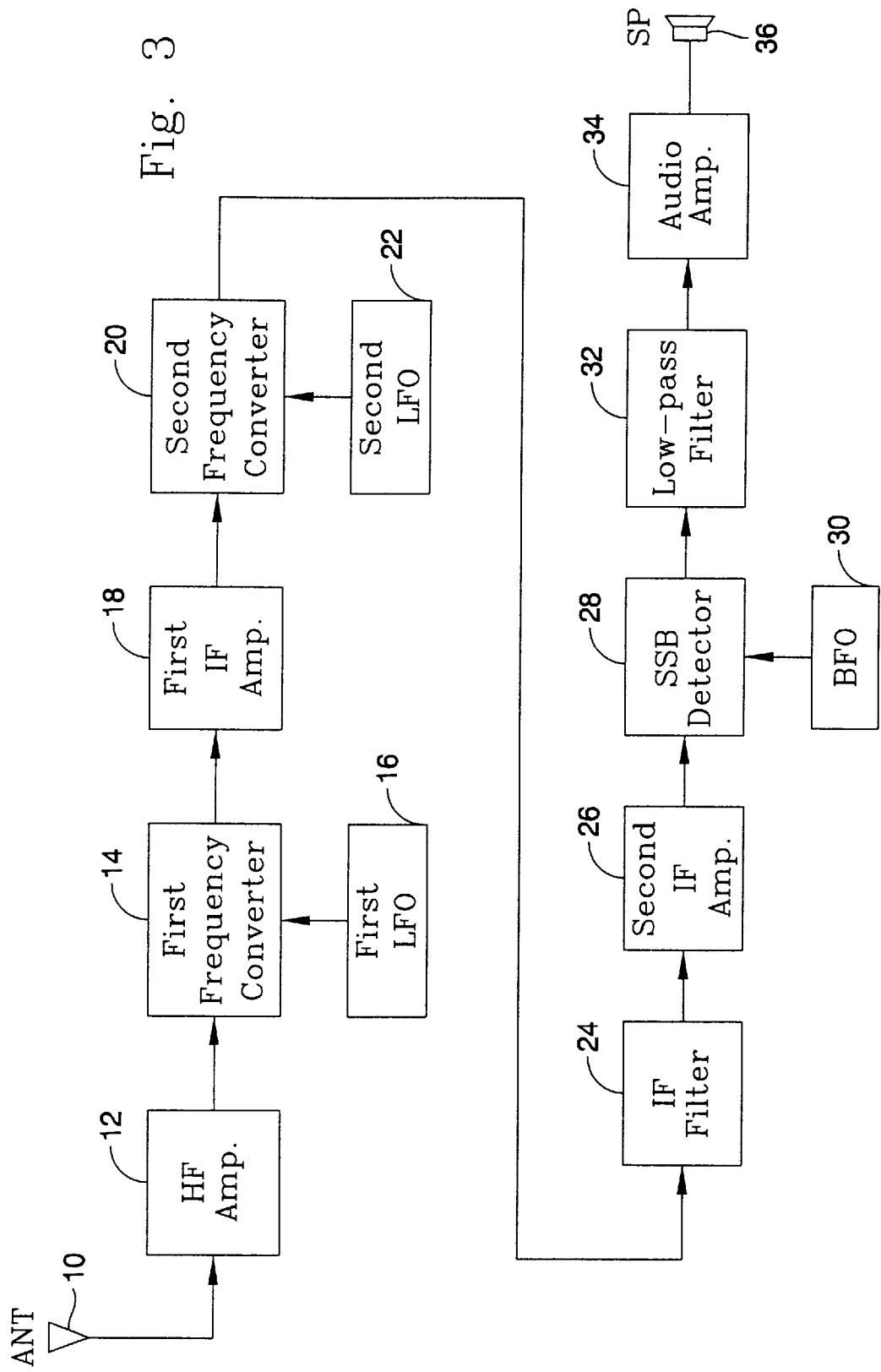
FIG. 3 illustrates a block diagram of the SSB radio receiver according to an embodiment this invention.

FIG. 3 illustrates a block diagram of the SSB radio receiver in accordance with the principles of the present invention. Reference numeral 12 identifies a high-frequency amplifier stage which amplifies SSB signals received by an antenna 10. An output signal from the high-frequency amplifier 12 is applied to a first frequency converter stage 14. The first frequency converter 14 provides an IF output signal having a frequency which is the difference between the frequency of a first local frequency oscillator (LFO) 16 and the frequency of the output of the high-frequency amplifier stage 12. The IF output signal of the first frequency converter stage 14 is amplified by a first IF amplifier 18, which may include a conventional crystal filter capable of passing through a signal of a first IF frequency as an output. The amplified first IF signal is then applied to a second frequency converter 20, which provides a output signal of a frequency which is the difference between the frequency of a second local frequency oscillator (LFO) 22 and the frequency of the output of the first IF amplifier stage 18. An output from the second frequency converter stage 20 is applied to the wide-band filter 24, as mentioned above in connection with FIG. 2, and further to an SSB detector stage 28, through a second IF amplifier stage 26.

In the SSB detector stage 28, the signal filtered by the wide-band filter 24 and amplified by the second IF amplifier 26 is SSB-detected by a BFO frequency from a beat frequency oscillator (BFO) 30, providing a detected output. The detected output of the SSB-detector stage 28 is then applied to a low-pass filter 32, which is correlated to the wide-band filter 24, which results in providing the same function as that of the narrow-band filter in the prior art SSB radio receiver, without the expense. The output of the low-pass filter 32 may further be applied to an audio speaker 36 through a low-frequency (audio) amplifier 34.

Therefore, the present invention can be regarded as replacing the expensive narrowband filter (the frequency response of which is shown in FIG. 1) of the prior art SSB radio receiver, by the utilization of the inexpensive wide-band filter 24 (the frequency response of which is shown in FIG. 2) and adding the low-pass filter 32 after the SSB detector stage 28.

Figure 4:
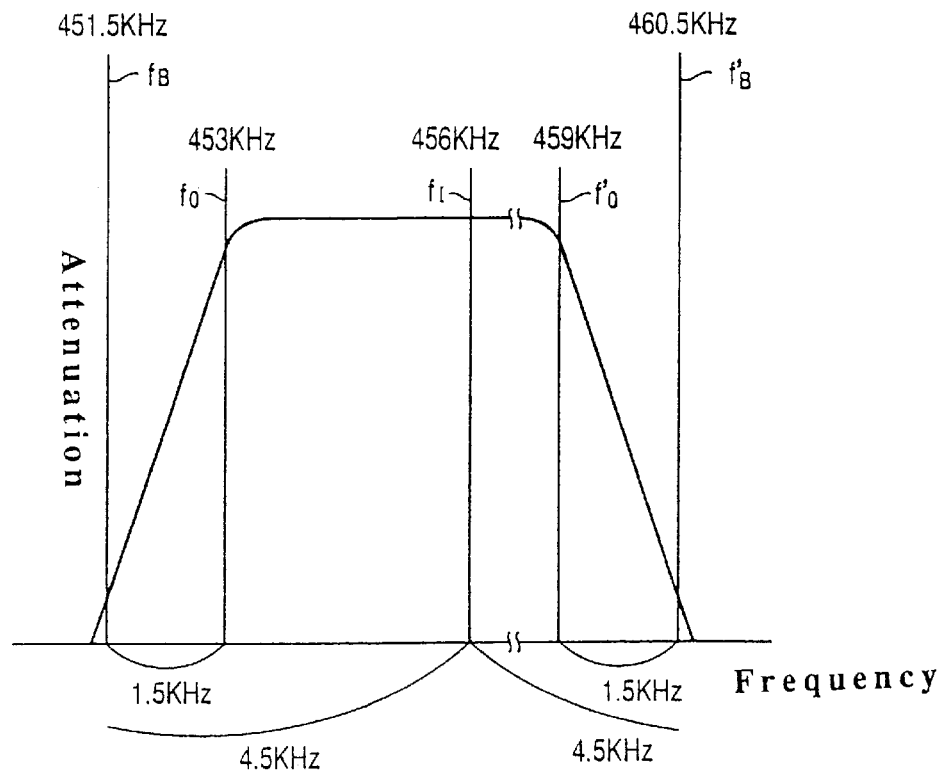
FIG. 4 is a graphical representation similar to that shown in FIG. 2, for use in illustrating and explaining the operation of the present invention.
Figure 5:
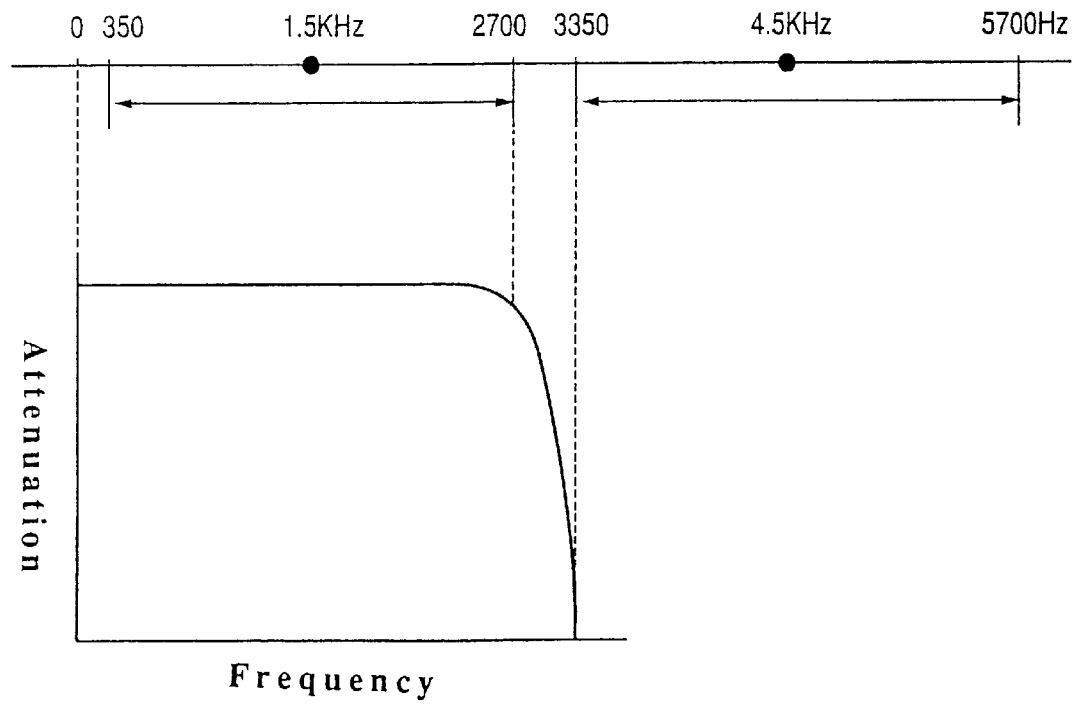
FIG. 5 is a graphical representation of a frequency response characteristic of a low-pass filter added to the SSB radio receiver, in accordance with the present invention.

FIGS. 4 and 5 are illustrations for explaining the operation of the present invention. FIG. 4 shows the frequency response characteristics of the wide-band filter 24. In FIG. 4, three signals $f_O$, $f_I$, and $f'_O$ are shown, within the pass-band of the wide-band IF filter 24. Also shown are two signals $f_B$ and $f'_B$, which are positioned outside of the pass-band of the IF filter 24. The signal $f_O$ identifies the reception objective SSB station IF signal of 453 KHz which is near the lower frequency side of the pass-band width of the wide-band IF filter 24. The signal $f_B$, which is located out of the pass-band of the wide-band IF filter 24, identifies the position and magnitude of the BFO signal of 451.5 KHz which is generated by the BFO 30 and applied to the SSB detector stage 28. The signal $f_I$ identifies the interference SSB station IF signal of 456 KHz which has been also passed through the wide-band filter 24 together with the reception objective SSB station IF signal fo. The signals fo and fi are outputted from the IF filter 24 simultaneously and applied to the SSB detector stage 28, through the second IF amplifier stage 26.

In the SSB detector stage 28, the two signals fo and fi are SSB-detected, using the BFO frequency signal fB from the BFO 30, resulting in signal fo being outputted as fo−fB=1.5 KHz, and the signal fi being outputted as fi−fB=4.5 KHz, from the SSB detector stage 28. As is well known, an audio signal to be transmitted from a transmitting station is usually modulated into a SSB modulation signal, with a specified frequency-band width, such as 350–2700 Hz represented by its central frequency of 1.5 KHz. As shown in FIG. 5, the detected output of the signal fo from the SSB detector stage 28 is spread over a frequency spectrum in the frequency range of 350–2700 Hz around its central frequency of 1.5 KHz. While the detected output of the signal fi from the SSB detector stage 28 is spread over the frequency spectrum in the frequency range of 3350–5700 Hz around its central frequency of 4.5 KHz.

These SSB detected outputs of signals fo and fi are then applied to the low-pass filter 32. A frequency response curve of the low-pass filter 32 is illustrated in FIG. 5. As is clearly shown by the frequency response curve, the low-pass filter 32 covers only the frequency range of the reproduced audio signal of the IF signal fo after it has been SSB-detected (350–2700 Hz). In other words, the low-pass filter 32 has a pass-band sufficient to pass through the upper end (2700 Hz) of the reproduced audio signal fo, which is represented by 1.5 KHz. Conversely, the detected output of the interference signal fi, which is represented by 4.5 KHz, is located in the cut-off area of the low-pass filter 32 as the interference signal fi lower frequency end (3350 Hz) is out of the pass-band of the low-pass filter 32. The low-pass filter 32, therefore, provides as output only the detected output of the reception objective IF signal fo, while the interference detected output of the IF signal fi is isolated. Accordingly, even though the SSB station IF signal fo, to be selectively received by the SSB radio receiver, and the interference SSB station signal fi are outputted from the wide-band filter 24 simultaneously, the low-pass filter 32 passes through only the reception objective signal fo so that no interference occurs with other disturbance signals.

In other words, the low-pass filter 32 has a pass band sufficient to pass through only the frequency range of the modulated reception objective IF signal fo. Therefore, only a reproduced audio signal of the reception objective IF signal fo can pass through the low-pass filter 32. When the interference SSB station signal fi, which has passed through the wide-band IF filter 24 simultaneously with the reception objective IF signal fo, is SSB detected, the central frequency of the reproduced audio signal of the interference SSB station signal fi is shifted in frequency. This frequency shift is the difference between the beat frequency oscillator (BFO) 30 frequency and the frequency of the interference SSB station signal fi. The frequency shift is of such a large magnitude as to result in the lower frequency of the shifted reproduced audio signal (interference SSB station signal fi) to be positioned out of the pass-band of the low-pass filter 32.

As can easily be understood, if there is an SSB station IF signal at the frequency position f'o of 459 KHz, this signal would also be passed through the IF filter 26 as it is within the pass-band of the filter 26, but the detected output of the signal f'o cannot be outputted from the low-pass filter 32 because it is spread around the central frequency of 7.5 KHz, and therefore has a frequency range which is out of the pass-band of the low-pass filter 32.

In this invention, the reception objective IF signal fo is preferably positioned within the pass-band of the filter 24 at a location which is nearest in frequency to the BFO frequency fB, fB itself being positioned out of the pass-band of the low-pass filter 24. For example, as shown in FIG. 4, the signal fo is positioned near one (lower) side of the pass-band width of the low-pass filter 24. The attenuation slope of the low-pass filter 24, between signals fo and fB, is preferably so rapid that even though there is an interference signal within the frequency area between fo and fB, it can be effectively cut off by the low-pass filter 24.

An inexpensive active filter can be used for the low-pass filter 32, since it covers merely the SSB audio frequency range. The addition of the active filter to the SSB radio receiver does not substantially increase the production cost of the SSB radio receiver. Furthermore, by using the active filter, it is possible to miniaturize the low-pass filter 32.

In the description hereinabove, the relationship between the signals between fo, fi, and fB is in reference to the lower side band reception. Alternately, this relationship is applicable to the upper side band reception, in connection with a desired reception objective SSB station IF signal f'o of 459 KHz, the interference SSB station IF signal f'i of 456 KHz, and the BFO signal f'B of 460.5 KHz.

While a preferred embodiment of the present invention is shown and described, it is envisioned that those skilled in the art may devise various modifications of the present invention without departing from the spirit and scope of the appended claims.

What is claimed is:

1. A single sideband (SSB) radio receiver comprising:
   a frequency converter, said frequency converter providing an IF signal of a SSB station signal;
   a wide-band IF filter for receiving said IF signal, said wide-band IF filter having a pass-band allowing for the simultaneous passage of a reception objective SSB station IF signal and at least one interference SSB station IF signal;
   detecting means receiving said IF signals passed through said IF filter, said detecting means simultaneously SSB-detecting said IF signals with a beat frequency oscillator frequency, said beat frequency oscillator frequency located out of said pass-band of said IF filter providing original modulating audio signals carried by said received IF signals as SSB detected output; said reception objective SSB station IF signal being positioned nearest to said beat frequency oscillator frequency in frequency, and frequency spectrums of said SSB-detected audio signals being separated by a difference, said difference being a frequency difference between said beat frequency oscillator frequency and said IF signals frequencies.
   an amplifier;
   a speaker connected to said amplifier; and
   a low-pass filter connected to said amplifier and receiving said SSB detected output, said low-pass filter having a pass-band width allowing only for the passage of said reception objective SSB station IF signal to said amplifier.

2. The SSB radio receiver as claimed in claim 1, wherein said wide-band IF filter is an inexpensive band-pass filter.

3. The SSB radio receiver as claimed in claim 1, wherein said low-pass filter comprises an inexpensive active filter.

4. The SSB radio receiver as claimed in claim 1, wherein said reception objective SSB station IF signal is positioned near a side of said pass-band frequency width of said IF filter.

5. The SSB radio receiver as claimed in claim 1, wherein said reception objective SSB station IF signal frequency is positioned nearest to said beat frequency oscillator frequency.

6. The SSB radio receiver as claimed in claim 4, wherein frequency spectrums of said SSB-detected audio signals are separated by the difference between said beat frequency oscillator frequency and the respective frequencies of said IF signals.

7. The SSB radio receiver as claimed in claim 5, wherein said low-pass filter has a pass-band in which an upper frequency limit of said SSB-detected output of said reception objective SSB station IF signal can be passed through by said lowpass filter, with the lower frequency limit of said SSB-detected output of said interference SSB station IF signal, which is farther in frequency from said beat frequency oscillator frequency, cut off by said low-pass filter.

8. A single sideband (SSB) radio receiver comprising:
a frequency converter, said frequency converter providing an IF signal of an SSB station signal;
a wide-band IF filter for receiving said IF signal, said wide-band IF filter having a pass-band allowing for the simultaneous passage of a reception objective SSB station IF signal and at least one interference SSB station IF signal;
detecting means receiving said IF signals passed through said IF filter, said detecting means simultaneously SSB-detecting said IF signals with a beat frequency oscillator frequency, said beat frequency oscillator frequency located out of the pass-band of said wide-band IF filter providing original modulating audio signals carried by said received IF signals as SSB-detected output, said reception objective SSB station IF signal being positioned nearest to said beat frequency oscillator frequency in frequency, and frequency spectrums of said SSB-detected audio signals being separated by a difference, said difference being a frequency difference between said beat frequency oscillator frequency and said IF signals frequencies;
an amplifier:
a speaker connected to said amplifier; and
a low-pass filter connected to said amplifier and having such pass-band in which an upper frequency limit of the SSB-detected output of said reception objective SSB station IF signal can be passed through by said lowpass filter to said amplifier, with the lower frequency limit of the SSB-detected output of said interference SSB station IF signal, which is farther from said beat frequency oscillator frequency in frequency, cut off by said low-pass filter.

9. The SSB radio receiver as claimed in claim 8, wherein said IF filter is an inexpensive band-pass filter.

10. The SSB radio receiver as claimed in claim 8, wherein said reception objective SSB station IF signal is positioned near a side of said pass-band frequency width of said IF filter.

11. The SSB radio receiver as claimed in claim 8, wherein said low-pass filter comprises an inexpensive active filter.

12. A method for receiving a single sideband signal comprising the steps of:
frequency converting a SSB signal for providing an IF signal of an SSB station signal;
filtering said IF signal through a wide band filter, said wide-band filter having a pass-band allowing for the simultaneous passage of a reception objective SSB station IF signal and at least one interference SSB station IF signal;
detecting said IF signals passed through said wide band filter with a detecting means, said detecting means simultaneously SSB-detecting said IF signals with a beat frequency oscillator frequency to provide original modulating audio signals carried by said received IF signals as a SSB-detected output;
filtering said SSB-detected output through a low pass filter, said low-pass filter having such pass-band that the upper frequency limit of said SSB-detected output of said reception objective SSB station IF signal can be passed through by said lowpass filter, with the lower frequency limit of said SSB-detected output of said interference SSB station IF signal, which is farther in frequency from a beat frequency oscillator frequency, cut off by said low-pass filter;
amplifying said upper frequency limit of said SSB-detected output of said reception objective SSB station IF signal using an amplifier connected to said low pass filter; and
providing said amplified upper frequency limit of said SSB-detected output of said reception objective SSB station IF signal to a speaker connected to said amplifier.

13. A method for receiving a single sideband signal as recited in claim 12, further including the step of amplifying said SSB signal with a high frequency amplifier before frequency converting said SSB signal.

14. A method for receiving a single sideband signal as recited in claim 12, wherein said frequency converting comprises frequency converting said SSB signal with a first signal frequency, said first signal frequency comprising the difference between a frequency of a first local oscillator and a frequency of a high frequency amplifier, providing a first IF signal; amplifying said first IF signal with an IF amplifier providing an amplified first IF signal output; and frequency converting said amplified first IF signal with a second signal frequency, said second signal frequency comprising the difference between a frequency of a second local oscillator and the frequency of said IF amplifier output.

15. A method for receiving a single sideband signal as recited in claim 12, wherein said detecting of said interference SSB station IF signal passed through said wide band filter provides a shifting of a central frequency of said interference SSB station IF signal, said central frequency being shifted in frequency by a frequency difference, said frequency difference being the difference between said beat frequency oscillator frequency and the frequency of said interference SSB station IF signal, said frequency difference being of a scale in which the lower frequency limit of an audio output produced from said interference SSB station IF signal is positioned out of said pass-band of said low-pass filter.

16. A method for receiving a single sideband signal comprising the steps of:
frequency converting a SSB signal for providing an IF signal of an SSB station signal;
filtering said IF signal through a wide band filter, said wide-band filter having a pass-band allowing for the simultaneous passage of a reception objective SSB station IF signal and at least one interference SSB station IF signal;
detecting said IF signals passed through said wide band filter with a detecting means, said detecting means simultaneously SSB-detecting said IF signals with a beat frequency oscillator frequency to provide original modulating audio signals carried by said received IF signals as a SSB-detected output;

filtering said SSB-detected output through a low pass filter, said low-pass filter having such pass-band that the lower frequency limit of said SSB-detected output of said reception objective SSB station IF signal can be passed through by said lowpass filter, with the upper frequency limit of said SSB-detected output of said interference SSB station IF signal, which is farther in frequency from a beat frequency oscillator frequency, cut off by said low-pass filter;

amplifying said lower frequency limit of said SSB-detected output of said reception objective SSB station IF signal using an amplifier connected to said low pass filter; and providing said amplified lower frequency limit of said SSB-detected output of said reception objective SSB station IF signal to a speaker connected to said amplifier.

17. A method for receiving a single sideband signal as recited in claim 16, further including the step of amplifying said SSB signal with a high frequency amplifier before frequency converting said SSB signal.

18. A method for receiving a single sideband signal as recited in claim 16, wherein said frequency converting comprises frequency converting said SSB signal with a first signal frequency, said first signal frequency comprising the difference between a frequency of a first local oscillator and a frequency amplifier, providing a first IF signal; amplifying said first IF signal with an IF amplifier providing an amplified first IF signal output; and frequency converting said amplified first IF signal with a second signal frequency, said second signal frequency comprising the difference between a frequency of a second local oscillator and the frequency of said IF amplifier output.

19. A method for receiving a single sideband signal as recited in claim 16, wherein said detecting of said interference SSB station IF signal passed through said wide band filter provides a shifting of a central frequency of said interference SSB station IF signal, said central frequency being shifted in frequency by a frequency difference, said frequency difference being the difference between said beat frequency oscillator frequency and the frequency of said interference SSB station IF signal, said frequency difference being of a scale in which the higher frequency limit of an audio output produced from said interference SSB station IF signal is positioned out of said pass-band of said low-pass filter.

* * * * *